(12) United States Patent
Grossi

(10) Patent No.: US 12,089,543 B2
(45) Date of Patent: Sep. 17, 2024

(54) SYSTEM AND METHOD OF AGRICULTURAL MANAGEMENT

(71) Applicant: FIENILE AGRONEGÓCIOS LTDA, Centro Patos de Minas MG (BR)

(72) Inventor: Gustavo Alexandre Grossi, Monte Carmelo MG (BR)

(73) Assignee: FIENILE AGRONEGÓCIOS LTDA, Centro Patos de Minas MG (BR)

( * ) Notice: Subject to any disclaimer, the term of this patent is extended or adjusted under 35 U.S.C. 154(b) by 0 days.

(21) Appl. No.: 18/292,837

(22) PCT Filed: Nov. 24, 2022

(86) PCT No.: PCT/BR2022/050461
§ 371 (c)(1),
(2) Date: Jan. 26, 2024

(87) PCT Pub. No.: WO2023/197049
PCT Pub. Date: Oct. 19, 2023

(65) Prior Publication Data
US 2024/0260518 A1    Aug. 8, 2024

(30) Foreign Application Priority Data

Apr. 14, 2022   (BR) .......................... 1020220072728

(51) Int. Cl.
*A01G 25/09* (2006.01)
*A01G 7/04* (2006.01)
*A01G 25/16* (2006.01)

(52) U.S. Cl.
CPC .......... *A01G 25/092* (2013.01); *A01G 7/045* (2013.01); *A01G 25/167* (2013.01)

(58) Field of Classification Search
CPC .......... A01G 7/045; A01G 9/20; A01G 9/245; A01G 25/09; A01G 25/092; A01G 25/167
(Continued)

(56) References Cited

U.S. PATENT DOCUMENTS

| 9,974,246 B2 * | 5/2018 | Frager ............... A01G 25/097 |
| 2002/0107586 A1 * | 8/2002 | Kreikemeier ...... G05B 19/0423 700/65 |

(Continued)

OTHER PUBLICATIONS

International Search Report and Written Opinion issued on Apr. 24, 2023 for corresponding PCT Application No. PCT/BR2022/050461.

*Primary Examiner* — Ebony E Evans
(74) *Attorney, Agent, or Firm* — POLSINELLI PC

(57) ABSTRACT

The system (100) comprises a modular agricultural irrigation pivot-like device (101) positioned on an agricultural field (200) in the cultivation of a crop (202*a*), the device (101) comprising artificial lighting sources (10*a*, 10*b*, 10*c*, 10*d*, 10*e*) arranged along the irrigation pivot device (101) at a predetermined distance above the aerial parts of the crop, comprising LEDs, and a plurality of energy sources that feed a plurality of artificial lighting sources, a processor in communication with a dimerizer and/or polarizer of artificial lighting sources and with power sources, wherein a processor a) adjusts (501), in the intervals of the electromagnetic spectrum, the balance between the spectral bands emitted by the light-emitting diodes; and b) determines and implements—an irrigation routine (502); and/or—light(s) supplementation routine (503); in which stages a) and b) are determined by a processor different parameters.

7 Claims, 8 Drawing Sheets

(58) Field of Classification Search
USPC .......................................................... 47/48.5
See application file for complete search history.

(56) References Cited

U.S. PATENT DOCUMENTS

| | | |
|---|---|---|
| 2002/0154504 A1 | 10/2002 | Fang et al. |
| 2012/0038281 A1 | 2/2012 | Verfuerth |
| 2013/0026259 A1* | 1/2013 | Korus .................. A01G 25/092 239/729 |
| 2013/0090766 A1* | 4/2013 | Pfrenger .............. A01G 25/092 239/731 |
| 2013/0139437 A1* | 6/2013 | Maxik .................... A01G 7/045 47/58.1 LS |
| 2013/0263503 A1 | 10/2013 | Bostdorff |
| 2016/0262313 A1 | 9/2016 | Szeto et al. |
| 2020/0359550 A1 | 11/2020 | Tran et al. |

\* cited by examiner

SYSTEM AND METHOD OF AGRICULTURAL MANAGEMENT

CROSS-REFERENCE TO RELATED APPLICATIONS

This application is a national stage application (under 35 U.S.C. § 371) of PCT/BR2022/050461, filed Nov. 24, 2022, which claims benefit of Brazilian Application No. 1020220072728, filed Apr. 14, 2022, which are incorporated herein by reference in their entireties.

FIELD OF THE INVENTION

The present invention refers, in general, to an agricultural management system. The present invention also refers to an agricultural management method. In particular, according to the present invention, the system and method of agricultural management include artificial light(s) supplementation and are directed to the cultivation of a crop in an agricultural field.

BACKGROUND OF THE INVENTION

Large-scale agricultural production has always been closely linked to and dependent on multiple variables. Such variables include the nutritional and microbiological factors of the soil, intrinsic characteristics of a given region (e.g., climate, photoperiod, and rainfall distribution), as well as a plurality of stresses that affect crops, such as pathogens (plant diseases), insect infestations (plant predations), invasive plants (weeds), extreme (deficit or excess) of climatic, light irradiation, nutritional and water factors, among others.

In the context of the current agro-industrial scenario, Brazil notably stands out as one of the largest producers and exporters of agricultural commodities, such as soybeans (*Glycine max*) and corn (*Zea mays*), with an annual grain production of over 270 million tons according to CONAB (Companhia Nacional de Abastecimento, Brazilian agricultural ministry department) 2022 estimations. Thus, it is evident that developing new techniques and technologies for crop management has a tremendous economic and industrial impact. In addition, agricultural production is pressured by the growing world population and, consequently, by the increased international demand for agricultural commodities.

In this sense, there have been several efforts of new technologies to model and monitor variables such as edaphoclimatic conditions to understand the consequences and interactions between soil and crop. For example, the use of technologies and strategies for soil management and water resources, intelligent use of agrochemicals, efficient application of fertilizers, integration of the Internet of Things (IoT) into agriculture, and climate monitoring practices are essential for high crop performance and yield.

In addition to monitoring and controlling external factors, other technologies can improve agricultural activity. For example, biological technologies, such as genetically modified cultivars, benefit farmers, consumers, the environment, and the economy; bioactive compounds, such as growth-regulating phytohormones, result in plant changes from germination to senescence and the source-drain relationship of photoassimilates in the plant during its cycle. Such technologies also improve the plant's resistance to adverse conditions during the crop cycle and increase the human nutritional value of crop production.

Over the past few decades, the use of such technologies has become constant to intensify agricultural production around the globe. The frequency of use of such technologies in South America and Asia farms has almost equated to the frequency of use in Europe and North America. However, climate change has recently caused a new demand for intensified agricultural production with more sustainable technological approaches. Additionally, the intensification of agricultural output to meet global demand is driven by the use of costly non-renewable fertilizers.

In this way, recent advances have been made in studies on artificial light(s) supplementation for crop production outdoor (large scales), defined as the process of applying artificial light(s) to plants grown in the open field, emphasizing the beneficial effects of the use of light-emitting diodes (LEDs) on plant's metabolism, on the efficiency of light absorption by the leaves, as well as the mitigation of abiotic (e.g., extreme temperatures and drought) and biotic (e.g., insect pests, plant diseases, weeds) stresses, while applying a sustainable management of the available resources.

Document US 2016/0198640 A1 reveals a mobile irrigation pivot equipped with sprinklers and a plurality of light-emitting diodes configured to emit different frequencies of polarized light in spectral bands from violet to far red spectrum over plants of short, long, or neutral photoperiod response in an agricultural field. The light-emitting diodes are fixed on the irrigation pivot structure, illustrated in FIG. 1 of the referred document.

The described irrigation pivot can also comprise a control circuit configured to control the operation of light-emitting diodes, irrigation parameters, and pivot moving.

Light(s) supplementation applied to crops can alter plant responses significantly. However, these responses are affected by several factors, such as plant species, crop management, soil fertility, water availability, and the prevailing climate. Document US 2016/0198640 A1 fails to reveal artificial light(s) supplementation combined with crop management factors. Instead, when artificial light(s) supplementation is used alone, as indicated in document US 2016/0198640 A1, this may not have the desired effect or may even impair plant development (empirical observation). Artificial light(s) supplementation may, for example, not achieve high yields if the applied fertilization does not adequately meet the desired level of crop production, or artificial light(s) supplementation may favor a condition of intense weeds competition in the crop field if an adequate positioning of herbicides is not made.

Noticeably, the state of the art lacks technological improvements regarding integrated crop management strategies. Actions in crop fields are still evaluated independently and not integrally. The sustainable use of energy, fertilizers, water, and adequate artificial light(s) supplementation are essential for sustainable large-scale improved cropping activities. These large-scale cropping activities have a great responsibility in human impact on Earth's environments. Improving the sustainability of large-scale cropping activities is possible with the present invention.

Objectives and Description of the Invention

Therefore, an objective of the present invention is to provide an agricultural management system combined with artificial light(s) supplementation capable of raising agricultural production in a cropping area, increasing its productivity, reducing the negative effects of stresses present in the outdoor environment, increasing the efficiency of the applied inputs for crop production and, in this way, reduce the limitations of the currently known cropping techniques.

Another objective of the present invention is to provide an agricultural management system via consultancy combined with adequate artificial light(s) supplementation routine. The light-emitting diodes can be implemented in any new or preexisting irrigation pivot in an agricultural cropping area. The routine of light(s) supplementation is usually independent of the irrigation routine.

Another objective of the present invention is to provide an agricultural management system combined with artificial light(s) supplementation capable of stimulating plant characteristics of any species at a given phenological stage. These responses are regulated by the moment of artificial light(s) supplementation, the predominant color in the artificial light(s) applied, and the interaction among these factors and the environment, crop genetics, crop response to photoperiod, and crop management.

Another objective of the present invention is to provide an agricultural management system combined with artificial light(s) supplementation capable of stimulating plant characteristics of a given species at a given phenological stage. These stimulated characteristics can improve plant performance against adverse stressful conditions that impair photosynthesis using natural light (sunlight) and reduce the negative effects of low natural luminosity during cloudy days.

Another objective of the present invention is to provide dimerization and/or polarization of the spectral bands in the artificial light(s) supplementation according to the crop species, region, soil physical and chemical conditions, climate, predominant agronomic management and type of agricultural production system in use (e.g., no-tillage cropping system).

Another objective of the present invention is to maintain and adapt the routine of water irrigation and light(s) supplementation at different phenological stages during all crop development stages, improving agricultural production in quantity, quality, and sustainability.

Another objective of the present invention is to protect crops against plant diseases and insect pests by modulating artificial light(s) supplementation. Artificial light(s) can be used to affect plant diseases and insect pest development, cycle, and pressure on crop performance. The improved crop protection advantageously has the potential to reduce the need for the application of phytosanitary products. This potential reduction in use of phytosanitary products (e.g., insecticides and fungicides) consequently reduces the damage caused to the environment by the excessive use of such products.

Another objective of the present invention is to act beyond the mere application of light(s) supplementation, as it must consider soil factors, plant nutrition levels, climate, photoperiod responses, agronomic management, and crop variety selection, among others, to achieve the balance between the demand of the plant stimulated by light(s) supplementation and the technical use of production resources. In other words, according to the present invention, artificial light(s) supplementation is a tool that must be inserted in a set of appropriate technical actions to achieve the best production results and sustainability of large-scale agriculture.

Finally, the present invention aims to increase the efficiency of production resources, such as irrigation, fertilizers, and agrochemicals (insecticides, fungicides, bactericides, fertilizers, stimulants, . . . ), due to the effects caused by artificial light(s) supplementation, such as a great development of the plant root system, allowing improved exploration of the soil profile and reduce the water, nutrients and agrochemicals losses.

One or more objectives of the above-mentioned invention(s), among others, are achieved by means of an agricultural management system combined with artificial light(s) supplementation, comprising:

a modular agricultural irrigation device positioned on an agricultural field using a plurality of artificial lighting sources arranged along the modular agricultural irrigation device, optionally at equidistant points and at a predetermined distance above the aerial crop parts.

a plurality of light-emitting diodes capable of emitting a plurality of electromagnetic spectrum bands applied alone or in combinations of different proportions of spectral bands from the limit of ultraviolet C and B (wavelength of 280 nm) to infrared (wavelength>700 nm); and a plurality of energy sources that feed a plurality of artificial lighting sources.

The agricultural management system also comprises a processor in communication with a dimerizer and/or polarizer of a plurality of artificial lighting sources and a plurality of energy sources, in which a processor is configured to a) adjust, in the intervals of the electromagnetic spectrum, the balance between the spectral bands emitted by a plurality of light-emitting diodes; and b) determine and implement—an irrigation routine; and/ or—an artificial light(s) supplementation routine; in which stages a) and b) are determined by a processor considering at least one among the crop species 202a under cultivation;

the phenological stage of the crop 202a under cultivation;

the photoperiod, station and current weather conditions under which the agricultural field 200 is subjected; and one or more objective(s) intended for the crop 202a development under light(s) supplementation.

Understand "objective(s) intended for the crop" as the main purpose of the cropping of such plant specie; if, for example, the crop is for grain production, then a crop and artificial light(s) management, or protocol, is applied; however, if the crop is only intended for cattle grazing, then another crop and artificial light(s) management, or protocol, is applied.

The objective(s) of the above-mentioned invention, among others, is also achieved by means of adequate agricultural management methods combined with artificial light (s) supplementation for crop cultivation in an agricultural field, comprising the stages a) adjusting the balance between the spectral bands emitted by a plurality of light-emitting diodes of a plurality of lighting sources artificially capable of emitting a plurality of electromagnetic spectrum bands applied alone, or in combinations of spectral bands from the limit of ultraviolet C and B (wavelength of 280 nm) to infrared (wavelength>700 nm); and b) determine and implement—an irrigation routine of a modular agricultural irrigation device; and/or a routine of artificial light(s) supplementation of a plurality of artificial lighting sources; in which stages a) and b) are determined considering at least one among the crop species under cultivation;

the phenological stage of the crop under cultivation;

the crop photoperiod response, crop cropping season and current weather conditions under which the agricultural field is subjected; and the objective(s) intended for the crop 202a development under light(s) supplementation.

BRIEF DESCRIPTION OF THE DRAWINGS

The objectives, technical effects and advantages of the present invention will be apparent with the following detailed description that refers to the attached figures, which illustrate, but not limited, embodiments of the objects claimed

DESCRIPTION OF EMBODIMENTS OF THE INVENTION

Figure 1:
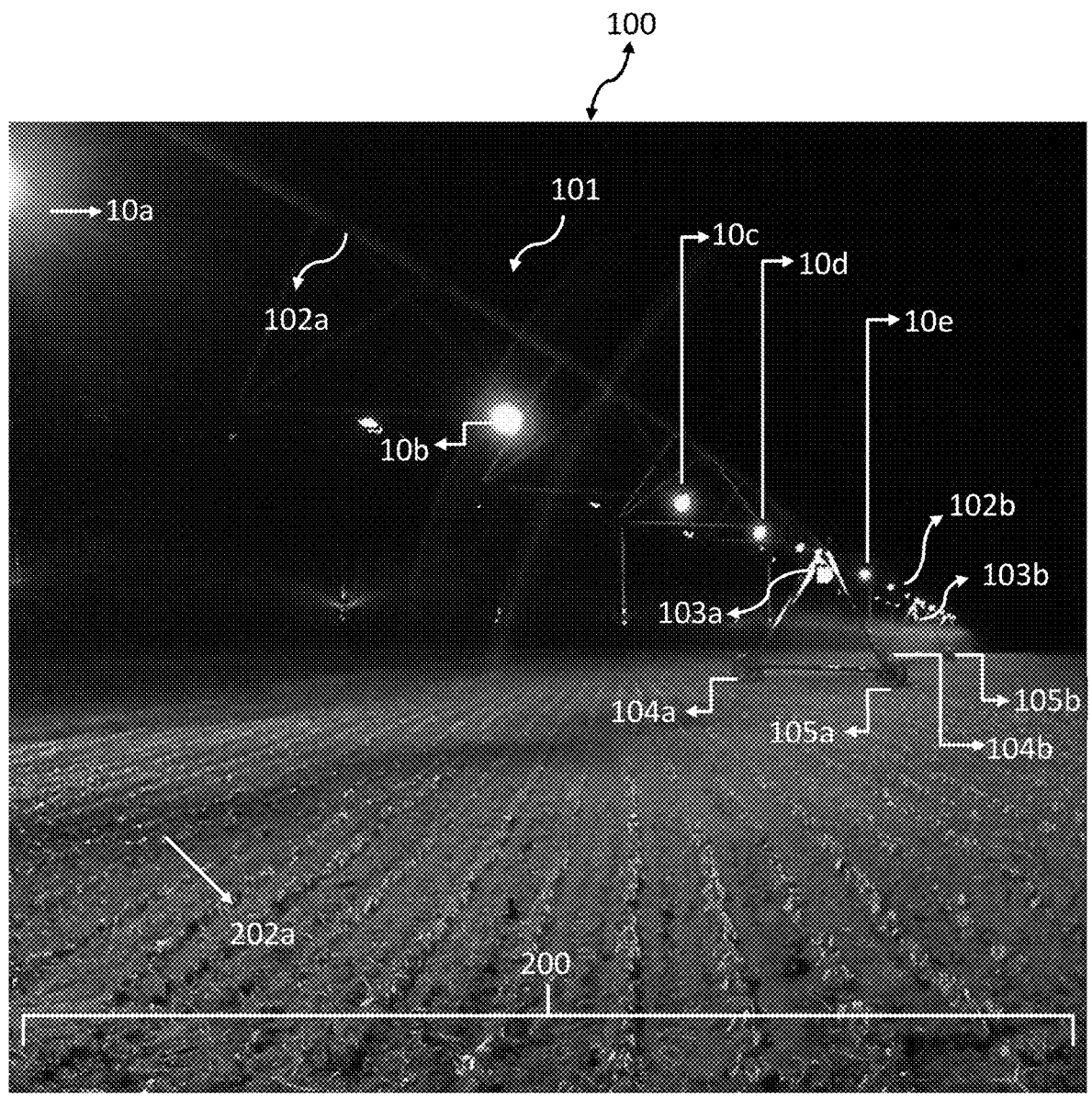
FIG. 1 illustrates a 100 agricultural management system combined with light(s) supplementation operating on a modular agricultural irrigation device 101 on an agricultural field 200, according to the present invention.

Initially, it should be noted that the system and method of the present invention will be described below according to particular but non-limiting embodiments since it may be executed in different ways and variations and according to the objective(s) intended for the crop 202a development under light(s) supplementation.

In one embodiment, the present invention reveals a 100 agricultural management system combined with artificial light(s) supplementation for the cultivation of a crop 202a in an agricultural field 200.

In another embodiment, the present invention reveals a 500 agricultural management method combined with artificial light(s) supplementation for the cultivation of a crop 202a in an agricultural field 200.

It is emphasized that adjustments in agricultural management and artificial light(s) supplementation should be implemented for each crop 202a and cropping region due to latitude, the height of the area compared to sea level, soil characteristics, and climate variations. The crop 202a phenological stage, photoperiod, the weather conditions under which the agricultural field 200 is submitted, and the objective with the plant development should also be considered to define the wavelength range applied and its combinations of electromagnetic spectrum bands to meet the specified objective. The luminous flux and the balance between the spectral bands emitted by a plurality of light-emitting diodes are, therefore, variable by means of digital dimerization and/or polarization and controllable by an electronic processor, according to the routine of artificial light(s) supplementation, which in turn takes into account the factors mentioned above.

It should be noted that the expressions "plant", "cultivate", or "culture" should be understood as any plant varieties, whether from long-day, such as oats (*Avena sativa*) or potato (*Solanum tuberosum*) or short-day plants, such as soy (*Glycine max*) or coffee (*Coffea* sp.), or neutral plants, which benefit from artificial light(s) supplementation in accordance with the present invention. Crop species evaluated with adequate crop corrections and management combined with artificial light(s) supplementation include soybean (*Glycine max*), bean (*Phaseolus vulgaris*), corn (*Zea mays*), tomato (*Solanum lycopersicum*), carrot (*Daucus carota*), sugarcane (*Saccharum officinarum*), tobacco (*Nicotiana tabacum*), garlic (*Allium sativum*), onion (*Allium cepa*), pea (*Pisum sativum*), sunflower (*Helianthus annuus*), sorghum (*Sorghum bicolor*), cotton (*Gossypium hirsutum*), potato (*Solanum tuberosum*), hops (*Humulus lupulus*), strawberry (*Fragaria*× *ananassa*), pitaya (*Hylocereus undatus*), lettuce (*Lactuca sativa*), arugula (*Eruca vesicaria* ssp. *sativa*) and agricultural soil cover crops. Each crop species received adjusted in artificial light(s) supplementation for each crop 202a and region of cultivation, as well as other factors such as the phenological stage of the crop 202a under cultivation, the photoperiod, and the meteorological conditions under which the agricultural field 200 is submitted and the objective(s) intended for the crop 202a development. All these crop species 202a showed positive results with adequate agricultural management and artificial light(s) supplementation, according to the present invention, compared to control (no artificial light(s) supplementation). The positive results are discussed below.

Furthermore, this descriptive report means "corrections" as any practice carried out by the producer in the agricultural area to improve the conditions available for plant development. In this sense, all practices that affect soil management (chemical and physical structure) and plant nutrition management (fertilizers) can be considered "corrections". Examples of corrections are the application of limestone (soil acidity correcting, calcium and magnesium source), the application of gypsum (reducing potential acidity in depth in the soil, source of calcium and sulfur), and the cultivation of cover crops (soil compaction management, nutrient recycling, pest control such as phytonematodes).

Figure 2:
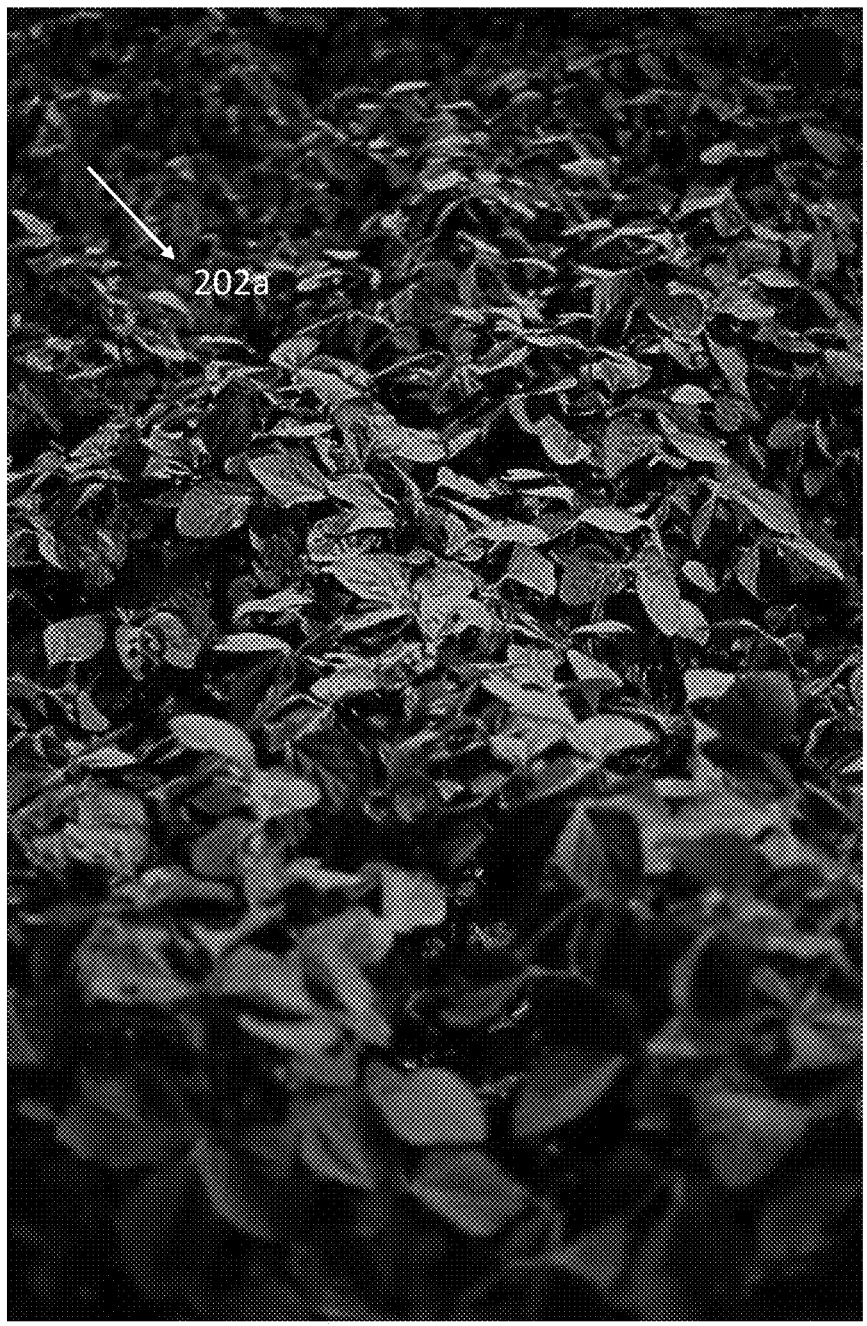
FIG. 2 shows an expansion of a crop 202a in the agricultural field 200 under the action of the agricultural management system 100 combined with artificial light(s) supplementation, according to the present invention.

As can be seen in FIGS. 1 and 2, the agricultural management system 100 combined with artificial light(s) supplementation, according to the application of the present invention, can be adapted to an irrigation new pivot or already existing in an agricultural field 200, such as a central irrigation pivot, whether towed or non-towable, or even a linear irrigation pivot. In this descriptive report, the pivot is generally described as "agricultural irrigation modular device 101".

This modular agricultural irrigation device 101 is positioned on the agricultural field 200 on which the cultivation of a crop 202a occurs, and the modular device 101 comprises an irrigation line 102a with wheeled towers and many spans (irrigation space between towers presenting oblong arms). The distal end of the first irrigation span 102a is supported by a wheeled tower 103a, and mechanically associated with a drive device, such as an engine or equivalent, and wheels 104a; 105a; the proximal end of the first irrigation span 102a is mechanically connected in a circular rotating way to the center of the pivot. The drive device triggers the tower 103a displacement.

The modular agricultural irrigation device 101 may have one or many wheeled towers and spans.

The span(s) of the modular device 101 presents a plurality of water sprinklers connected to a hydraulic pressure line in water communication with a reservoir which may be arranged, for example, at a central pivot, in the hydraulic line extending along the pivot spans 102a; 102b, which are equipped with water sprinklers in order to promote the irrigation of the agricultural field 200.

The agricultural management system 100, combined with artificial light(s) supplementation, incorporates a plurality of artificial lighting sources 10a, 10b, 10c, 10d, 10e arranged, for example, along the irrigation spans 102a; 102b of the agricultural irrigation modular device 101 and may be located at specific points and at a predetermined distance above the aerial part (canopy, plant shoot) of the crops 202a, the distance from the ground and other sources of artificial lighting 10a, 10b, 10c, 10d, 10e can also be adjusted as necessary, depending on the type of modular device 101 that will receive the artificial lighting sources and the crop 202a species under cultivation.

In addition, a plurality of artificial lighting sources 10a, 10b, 10c, 10d, 10e comprise a plurality of light-emitting diodes. In a preferred embodiment, light-emitting diodes are full-spectrum with wavelengths ranging from 280 nm, at the limit of the UV-C spectrum with UV-B, up to 1200 nm, in the near-infrared spectrum, over agricultural crop 202as (whether short, long or neutral-day plants) which are directly associated with biomass production, plant morphology, plant resistance to stresses, and crop development 202a. In one embodiment, the wavelength interval applied may be the same during the day or night but with variable luminous flux intensities.

The system 100 also comprises a plurality of energy sources, feed a plurality of artificial lighting sources 10a, 10b, 10c, 10d, 10e, as well as a processor in communication with the water sprinkles, the pivot drive device, and a dimerizer or polarizer of a plurality of artificial lighting sources 10a, 10b, 10c, 10d, 10e The referred processor is configured to adjust 501 the light spectral bands, the balance between these spectral bands emitted by a plurality of light-emitting diodes, and determine an irrigation routine 502 and an artificial light(s) supplementation 503 routine. The irrigation routines and artificial light(s) supplementation are independent. In other words, according to the established routine, a processor can command the action of the drive device, water sprinkle device, and the light dimerizer or polarizer. A processor determines this routine, preferably using an artificial intelligence model, considering the crop 202a species under cultivation; the phenological stage of the crop 202a under cultivation; the photoperiod and weather conditions under which the agricultural field 200 is/was subjected; the objectives intended for the crop 202a development, and information provided by users (farmers) through a user interface, which will be commented on below.

In an embodiment of the artificial light(s) supplementation routine, the crop 202a plant development can be stimulated or inhibit the production of leaves, branches, flowers, and roots; stimulate or inhibit the production of grains, fibers, fruits, and essences; stimulate or inhibit vegetative and reproductive growth, and stimulate plant photosynthesis.

In an embodiment of the artificial light(s) supplementation routine, a processor may be in communication with a plurality of photoresponsive sensors to determine a threshold of sunlight incidence, which controls the performance of a plurality of light-emitting diodes and routines of application, reducing the negative effects of weather adversities under which the agricultural field 200 is subjected, such as cloudy days with a low sunlight incidence.

It is also noteworthy that the threshold of light incidence may additionally depend on other factors, such as the crop 202 species under cultivation, current crop 202a phenological stage, the region (e.g., information regarding soil, climate, history of the cropping area), and crop 202a management applied.

A light dimerizer or polarizer adjusts the luminous flux and the balance between the spectral bands emitted by a plurality of light-emitting diodes. The light dimerization or polarization is controllable by the interaction between photoresponsive cells and a processor to define a routine of light artificial supplementation. The definition of such routine takes into account the factors mentioned above. For example, for crops 202a in general, the basic phenological stages are vegetative (V) (crop cycle period before flowering and where pre-flowering occurs) and reproductive (R) (begins with the first reproductive structure, usually flowers), in which specific artificial light(s) supplementation with specific spectral band composition is applied. This balance of spectral bands can be the same applied during the day or night or may diverge between these periods, varying the intensity of the luminous flux and spectral band composition. In nocturnal applications, the luminous flux can be adjusted to be lower, for example, than the luminous flux in daytime applications, intending only to cause stimuli in crop 202a plants, which will be commented on below. Especially in daytime applications, the luminous flux can be adjusted to be higher in cloudy periods, intending to mitigate the effects of photosynthetic reduction due to low natural light availability.

This is especially advantageous, as cloudiness can reduce the photosynthetic capacity of the crop 202a plants by more than 50%, causing the crop 202a to produce fewer sugars (assimilated organic carbon via photosynthesis) and consequently grow less and produce less biomass (e.g., grains, fruits, fibers). This reduction in photosynthetic activity also results in smaller amounts of root exudates released to the soil (decreasing the soil aggregating effect) and lower symbiont microorganisms (due to decreased root exudate supply), which in turn have the function of obtaining nutrients from the environment to the crop 202a, making them more resistant to pathogens and agricultural pests. Thus, it is evident that compensation for the low incidence of natural sunlight is a decisive factor for soil structuring and plant protection against pathogens and agricultural pests.

In another embodiment, a plurality of energy sources can be generated by wind, sunlight, thermal, or combustion generators in order to feed a plurality of artificial lighting sources 10a, 10b, 10c, 10d, 10e. In any of these embodiments, a processor may be in communication with a machine-readable memory, which stores database information comprising real-time updates on the geolocation of agricultural field 200 and climate indicators to suggest to the user, through a user interface, the crop 202a variety to be cultivated.

The user interface is in communication with a processor, and in turn, the user feeds other information to a processor, through the interface, such as
- the history of cultivation of the agricultural field 200 in order to identify successful plants species and crop varieties previously cultivated in the agricultural field 200;
- the history of agricultural inputs used in the agricultural field 200, such as fertilizations and corrections made;
- the occurrence of stresses in plants, such as the emergence of plant diseases and insect pest infestation, nutritional deficiencies, extreme of temperatures and rainfall distribution;
- the occurrence, intensity and determination of the principal weeds;
- results of productivity from previous harvests;
- the characteristics of the irrigation pivot 101, such as irrigated area, irrigation flow, working speeds and the height of the structure wherein a plurality of artificial lighting sources 10a, 10b, 10c, 10d, 10e are fixed in order to adjust the illumination of the light-emitting diodes as a function of the distance of a plurality of artificial lighting sources 10a, 10b, 10c, 10d, 10e
- the current crop season weather conditions and weather indicators of the crop field area.

The user interfaces in an embodiment implemented on a panel, mobile phone, tablet, or similar mobile devices with a direct connection to a center of information where the reported data will be processed, and the artificial intelligence will be fed.

In another embodiment, a plurality of energy sources uses information such as the sunlight duration, cloudiness, sunlight brightness as well as the insolation index (ratio between the actual number and the maximum possible number of hours of sunlight brightness) to determine the threshold of sunlight incidence in the agricultural field 200. Below the calculated threshold and depending on a certain routine of artificial light(s) supplementation, a processor interacts with the dimerizer or polarizer to command the performance of a plurality of light-emitting diodes and project artificial light(s) with specific spectral band composition, reducing the negative impact of meteorological adversities (e.g., cloudy days) under which the agricultural field 200 is subjected.

In one embodiment, data on the crop 202a species, crop 202a phenological stage, photoperiod, meteorological conditions under which the agricultural field 200 is submitted, objective(s) intended for the crop 202a development, as well as the technologies implemented in the agricultural field (fertilizers, agrochemicals, and soil management techniques) are stored in a machine-readable memory and accessed by a processor, in order to properly apply light(s) supplementation, according to parameters provided by the machine-readable memory.

Such previous information on the agricultural field 200 and the routine of artificial light(s) supplementation is important because they help
- in understanding and predict the consequences and interactions potentially present in the agricultural field 200;
- indicate improvements and corrections to be implemented in the agricultural field 200 for the optimization of the results of artificial light(s) supplementation;
- assist in the use of technologies and strategies for soil and water resources management;
- assist in the intelligent use of agrochemicals and in the efficient application of fertilizers; —assist in the integration of internet of things (IoT) to monitor crop (satellite), climate and agricultural practices; and
- help to improve the application format of the routine of artificial light(s) supplementation, such as the type of artificial lighting source 10a, 10b, 10C, 10D, 10e to be used, such as light-emitting diode panels (LEDs), led strips (LED), lamps in general, and their respective power, frequency and wavelength.

In addition, pedological, edaphological, mineralogical, textural, phytopathological, and nutritional analyses are essential before the agricultural field 200 receives adequate agricultural management and artificial light(s) supplementation routine. It is impossible to define the best inputs management for crop production without knowing such mentioned information. How many, how much, and when to apply fertilizers for high crop performance under artificial light supplementation? Soil, irrigation, and phytosanitary management, what is the best routine? It is necessary to know the soil conditions before implementing adequate agricultural and artificial light(s) supplementation management to understand how soil will behave after the referred implementation.

The 100 system of the present invention comprises a plurality of soil sensors under the agricultural field 200 to capture nutritional data from the soil of the agricultural field 200. A processor uses the data to determine and suggest routines for soil treatment/corrections of the agricultural field 200. The respective recommendation made by a processor, using an artificial intelligence model fed with specific parameters and users information, considering the crop parameters, adjusts the balance between the spectral bands 501, and determines the irrigation routine 502 and artificial light(s) supplementation 503.

Short-day crops, such as soybean (*Glycine max*), are largely influenced by abiotic factors such as photoperiod and temperature. Soybean flowering and reproductive cycle occur under short photoperiodisms, that is, on days when the absence of light (night period) is longer than the presence of light (day period). While the opposite, extended day periods can delay or inhibit flowering and the beginning of the reproductive cycle. This condition of dependence on the photoperiod allows light(s) supplementation to influence the extension of the crop 202a cycle. Consequently, plant height, number of internodes, pods, seeds per pod, and distribution of pods in the aerial parts of soybean are affected by extended photoperiods through adequate agricultural and artificial light(s) supplementation management.

It is also important to mention that for a positive balance for photosynthesis, the luminous flux is usually between 200 and 600 $\mu mol\ m^{-2}\ s^{-1}$. However, artificial light(s) supplementation acts on other physiological aspects that directly and indirectly affect photosynthesis in the plant, and not necessarily artificial light(s) supplementation is applied to be the light source that momentarily causes photosynthesis. This light source may have a luminous flux of less than 200 $\mu mol\ m^{-2}\ s^{-1}$.

In general, artificial lighting sources 10a, 10b, 10c, 10d, 10e with luminous flux less than 200 $\mu mol\ m^{-2}\ s^{-1}$ are not able to cause considerable amounts of positive photosynthesis on most plants. However, even smaller luminous fluxes can cause stimuli in crop 202a that can directly or indirectly positively affect photosynthesis to be performed the following day after the night of application of artificial light(s) supplementation. Therefore, a low luminosity, capable only of causing other responses but unable to directly cause considerable amounts of positive photosynthesis; a higher luminosity, will consequently have specific and useful applications according to the present invention.

Artificial light(s) supplementation, according to the present invention, is, therefore, a tool within a broad technical project that interacts both with the agricultural management of soil aspects, such as soil fertility and texture, and plant nutrition, as well as with the pathological and beneficial microbiological aspects, environmental aspects, such as temperature and rain in the agricultural region, and economic aspects, such as the cost of production and marketing of agricultural commodities that receive agricultural management combined with artificial light(s) supplementation according to the present invention.

The increase in agricultural production, according to the present invention, is the result of the interaction among stimulated crop 202a physiological processes by light(s) supplementation, the time defined for sowing, irrigation volume, time of application, formulation, frequency, and dosage of fertilizers, climate variation, management of insect pests and plant diseases and their impacts on the relationships with the environment. Agricultural cultivation with this integration of adequate technical knowledge (agricultural management) and artificial light(s) supplementation, according to the present invention, increases the resilience and stability of crop production, which increases regional and global food security.

It is noteworthy here that artificial light(s) supplementation improves the result of good management but does not correct poor management. In other words, according to the present invention, artificial light(s) supplementation enhances the development of plants that are well nourished, with good water distribution throughout the crop cycle, and that present soil physical and chemical structure suitable for high yields. Under these conditions, supplement artificial light(s) will generate the best results. However, if light(s) supplementation is not combined with adequate agricultural management, then light(s) supplementation alone cannot fix preexisting limitations for the full development of plants, such as nutritional deficiencies, lack of water, insect infestations, or the presence of agricultural pathogens.

The application of agricultural management and artificial light(s) supplementation, according to the present invention, does not present contraindications regarding—crop 202a species (any cultivated plant specie would benefit from adequate agricultural management and artificial light(s) supplementation); phenological stage during crop 202a cycle (vegetative or flowering/reproductive); —joint application, or not, with water irrigation.

In addition, the application of agricultural management and artificial light(s) supplementation, according to the present invention—can be handled to raise the levels of specific substances in the final product (e.g., grains, fruits, and fibers); —recommend the dimerization/polarization of the light spectrum to be applied with the development of the crop 202a (e.g., modification of the bluish spectrum in the vegetative to the reddish spectrum in the reproductive stage); and—recommend the application of artificial light(s) supplementation at specific periods of the crop 202a cycle, and not applied throughout the crop cycle, from sowing to harvest.

Without getting in the light of any specific theory, it was observed that light dimerization/polarization effects are beneficial, including changes in plant morphology, crop cycle extension, physiological responses, and plant productivity.

For example, it was observed that the bluish spectrum (spectral band of approximately 400 to 500 nm) is a stimulant of vegetative growth, which is appropriate for plants before flowering. After flowering, plants paralyze growth investments and start investing in grain, fiber, fruit, or essence production.

In turn, it was observed that the reddish spectrum (spectral band of approximately 600 to 750 nm) is a stimulant of reproductive growth, with beneficial effects for flowering, the rate of photosynthesis, and fruit formation. In this post-flowering period, the photosynthetic activity for biomass accumulation and the translocation of these reserves produced to "fill" production is essential. Therefore, avoiding the blue spectrum, or having less blue, is important in the reproductive phenological stage because blue is a stimulant of the vegetative stage, which would cause nutrient reserves to be consumed and not destined to fill the production. On the other hand, having the red spectrum, or having redder to stimulate photosynthesis and the distribution of reserves, is essential for the best results in the reproductive stage.

In a preferred embodiment, the balance between red-green-blue spectral bands presents at least 40% blue color for vegetative phenological stages and about 60% or at least 40% red color for the reproductive phenological stage of the crop 202a under cultivation. More than 40% red color in the artificial light(s) supplementation is recommended for any plant phenological stage.

Figure 3:
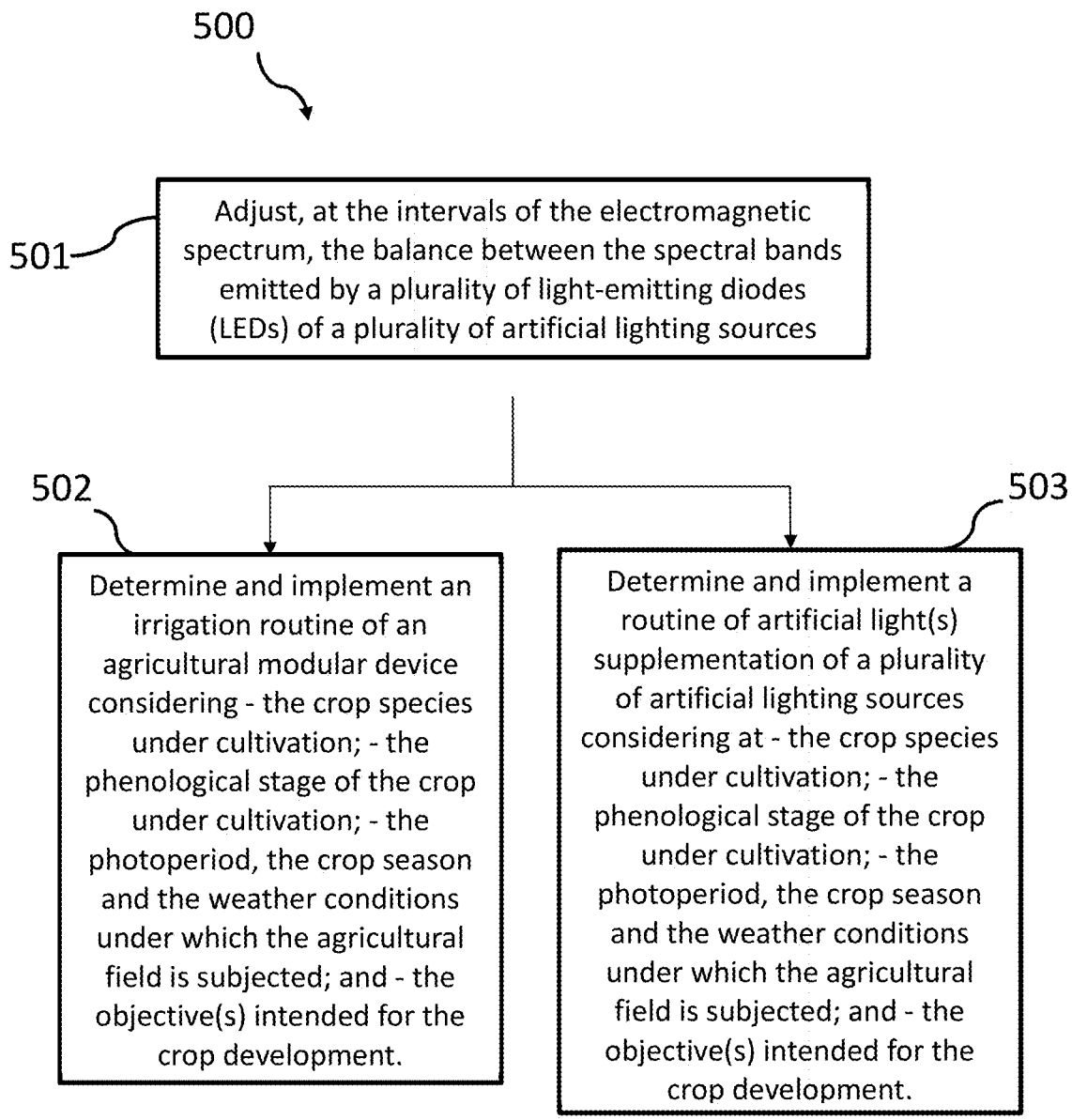
FIG. 3 illustrates the stages of the logic operation of the agricultural management method 500 combined with artificial light(s) supplementation, according to an embodiment of the present invention.

FIG. 3 illustrates the agricultural management method 500 combined with artificial light(s) supplementation for the cultivation of a crop 202a in an agricultural field 200, which comprises the stages a) adjusting 501, in the intervals of the electromagnetic spectrum, the balance between the spectral bands emitted by a plurality of light-emitting diodes of a plurality of artificial lighting sources 10a, 10b, 10c, 10d, 10e; and b) determine and implement an irrigation routine 502 of a modular agricultural irrigation device 101; and/or a routine of artificial light(s) supplementation 503 of a plurality of artificial lighting sources 10a, 10b, 10c, 10d, 10e in which the irrigation routine 502 and the supplementation routine are independent of each other, and in which stages a) and b) are determined through an artificial intelligence model considering at least one of the type of crop 202a under cultivation; the phenological stage of the crop 202a under cultivation; the photoperiod, station and current weather conditions under which the agricultural field 200 is subjected; and the objective(s) intended for the crop 202a development.

Method 500 also comprises stage c) determining and suggesting a soil treatment routine based on soil nutritional data from the agricultural field 200, stage c) being defined through the artificial intelligence model considering at least one of the same parameters considered for stages a) and b), in addition to considering the irrigation routine 502 and/or the routine of artificial light(s) supplementation 503.

In a preferred embodiment, the objective(s) with crop 202a development is to stimulate or inhibit the production of leaves, branches, roots, grains, fibers, fruits, and essences and, also, to stimulate or inhibit vegetative and reproductive growth and photosynthesis.

In a preferred embodiment, the routine of artificial light(s) supplementation 503 occurs, preferably, between the phenological stages V3-V4 to R5-R6 of the crop 202a under cultivation, and the balance between the spectral bands is adjusted 501, the balance between red-green-blue spectral bands presents at least 40% blue color for vegetative phenological stages and about 60% or at least 40% red color for the reproductive phenological stage of the crop 202a under cultivation. More than 40% red color in the artificial light(s) supplementation is recommended for any plant phenological stage.

Example 1

Reference is made to an example (technically adequate and representative study) in which the present invention was carefully implemented in order to verify its effectiveness.

at 980 m above sea level. The most common and representative biome of the region is the Cerrado (savannah-like biome). The climate of the region is humid tropical, with rainy summers and dry winters.

Physical analyses of the soil in the agricultural area 200, from 0 to 0.4 m deep, indicated 450, 100, and 450 g kg$^{-1}$ of sand, silt, and clay, respectively. The chemical analyses of the soil up to the depth of 0.4 m did not indicate the acute deficiency of any nutrient necessary for the crops to complete their cultivation cycle fully. The soil analyses are presented in Table 1.

TABLE 1

| pH H$_2$O | Ca | Mg | Al | H + Al | CEC | V | P | K | S.O.M |
|---|---|---|---|---|---|---|---|---|---|
| 1-2.5 | ----------cmol$_c$ dm$^{-3}$---------- | | | | | % | ----mg dm$^{-3}$---- | | g kg$^{-1}$ |
| | ----------------------------0-0.2 m soil depth---------------------------- | | | | | | | | |
| 6.9 | 6.03 | 2.87 | 0 | 1.26 | 10.44 | 88 | 188 | 96 | 2.9 |
| | ----------------------------0.2-0.4 m soil depth---------------------------- | | | | | | | | |
| 6.8 | 5.70 | 2.78 | 0 | 1.08 | 9.77 | 89 | 158 | 82 | 2.3 |

| B | Co | Cu | Fe | Mn | Mo | Si | Zn |
|---|---|---|---|---|---|---|---|
| | --------------------------------------mg dm$^{-3}$-------------------------------------- | | | | | | |
| | ----------------------------0-0.2 m soil depth---------------------------- | | | | | | |
| 0.19 | 1.7 | 9.0 | 14.0 | 1.9 | 2.9 | 12.4 | 12.8 |
| | ----------------------------0.2-0.4 m soil depth---------------------------- | | | | | | |
| 0.14 | 1.3 | 7.7 | 17.0 | 3.5 | 2.3 | 11.4 | 11.1 |

According to the present invention, this example evaluated the soybean 202a plant responses related to plant development and crop productivity in an open commercial area 200 (field scale) cultivated under agricultural management conditions and artificial light(s) supplementation. An irrigation pivot 101, irrigating a commercial cropping area 200, received an artificial lighting source 10a, 10b, 10c, 10d, 10e, according to the present invention, in internal pivot 101 spans for artificial light(s) supplementation of the soybean plants 202a.

According to the example, about 40 hours of artificial light(s) supplementation was applied to soybean plants 202a during the soybean crop 202a cycle. The number of plant internodes, soybean plant height, and the number of pods per soybean plant were evaluated weekly to calculate the area below the variable progression curve. Grain yield at harvest was also evaluated. Later, the area below the progression curve of the number of internodes, soybean plants height, and pods per soybean plant was positively affected by the system and method of adequate agricultural management combined with artificial light(s) supplementation 100, 500, 15 according to the present invention.

The regular soybean 202a cycle, without artificial light(s) supplementation, is about 15 to 17 weeks; however, soybean harvesting occurred two weeks later when no artificial light(s) supplementation was applied. The artificial light(s) supplementation increased soybean grain yield by 57.3% and profitability by 180% when compared to soybean cropping without artificial light(s) supplementation.

Methodology Experimental Area And Soybean CUltivation

The experiment with light(s) supplementation on soybean was carried out in an irrigation pivot 101, on a commercial farm in Monte Carmelo, Minas Gerais state, Brazil. Located at a latitude and longitude of 18° 57" South, 47° 25" West, Despite the large soil clay proportion and high soil fertility, 3,000 kg ha$^{-1}$ of soil remineralizer (rock powder) (FMX® Tratto. Aparecida from Goiânia, Brazil) was applied throughout the experimental area 200, 30 days before the soybean sowing 202a; 400 kg ha$^{-1}$ of organomineral 6-30-05 (% of N, P$_2$O$_5$, K$_2$O) (Valoriza Agro Ltda. Patos de Minas, Brazil) and 150 kg ha$^{-1}$ of KCl was applied at the time of sowing, and 2 L ha$^{-1}$ of Mn was sprayed on the aerial parts of the soybean plants 202a, 40 days after the crop 202a seed germination.

The soybean cultivar 202a evaluated in this example was Desafio 8473 RSF (Brasmax® GDM. Cambé, Brazil), which is a soybean variety with indeterminate growth and 7.4 maturity group. Fourteen seeds per linear meter (280,000 plants per hectare) were sowed in lines spaced by 0.5 m; plants 202a were harvested approximately 4 months later. The soybean plants cultivated with no artificial light(s) supplementation were harvested first. The average daily air temperature during the experimental period ranged from 24 to 34° C.

In the experimental area, insects, pests, plant diseases, and weeds were controlled with products registered for soybeans as indicated by the manufacturer. All areas were monitored before and after the first application, and the products were reapplied as needed. The management of crop plants 202a and water irrigation were similar between the areas that received the artificial light(s) supplementation and the control [area with no without artificial light(s) supplementation].

EXPERIMENTAL TREATMENTS AND RESEARCH

The central irrigation pivot 101 that was implemented with the artificial light(s) supplementation light source had ten spans and an irrigation radius of about 571 m. In the four internal spans of the referred irrigation pivot 101, which corresponds to an area of 33.5 ha, the artificial light source 10a, 10b, 10c, 10d, 10e was installed, but the six external spans of irrigation pivot 101, corresponding to an area of 69.5 ha, did not receive artificial light(s) supplementation (control). The main composition of the red-green-blue (RGB) light delivered to the soybean plants presented about 59% red, 33% green, and 8% blue. A continuous light band of approximately 40 m wide by 230 m long was projected below the arm extension of the four internal spans of the irrigation pivot 101.

Each light-emitting diode has a power ranging from 50 to 200 W. About 600 W $h^{-1}$ $ha^{-1}$ were consumed during the artificial light(s) supplementation process. The light-emitting diode module were positioned about 3 meters above the aerial parts of the crop 202a plants and distributed to ensure an equally distributed light power in each span of the circular pivot. The luminous flux per unit area at the level of the aerial parts of soybean 202a plants was about 30 lx.

The artificial light(s) supplementation system 100, according to the present invention, was turned on every night after the full sunset and on very cloudy days. Approximately 480 hours of artificial light(s) supplementation was applied throughout the area during the soybean crop 202a cycle. As irrigation pivot 101 completes a turnover the cultivation area 200 in 12.8 hours in a circular routine, each crop 202a plant received about 40 hours of artificial light(s) supplementation during its cycle. During the soybean cycle, foliar fertilizers containing micronutrients, such as boron and manganese, were applied throughout the area [with and without artificial light(s) supplementation] to compensate for the intense development of plants stimulated by artificial light(s) supplementation.

Artificial light(s) supplementation began in V3-V4 (third to fourth fully expanded trifoliated leaf) soybean phenological stage and ended in the R5-R6 soybean phenological stage (full grain stage). The choice of vegetative phenological stage V3-V4 for the beginning of artificial light(s) supplementation allows crop 202a to close the space between lines in the agricultural field 200 and begin cultivation area covering (a situation where the plant's growth is enough to shelter all exposed soil from an up-sight perspective). If artificial light(s) supplementation is applied before soybean plants cover the cropping area, weed plants start to compete for resources with crop 202a. The plant competition for resources such as water, nutrients, and light, impairs crop performance and yield and increases herbicide costs. In turn, the choice of the end of artificial light(s) supplementation in the reproductive phenological stage R5-R6 is due to the fact that at this stage, the soybean crop 202a reached its final development. However, it should be noted that artificial light(s) supplementation could continue after R5-R6 stage, favoring some extra crop 202a production; however, the benefits would not be higher than the energy costs related to artificial light(s) supplementation beyond this plant stage.

Figure 4:
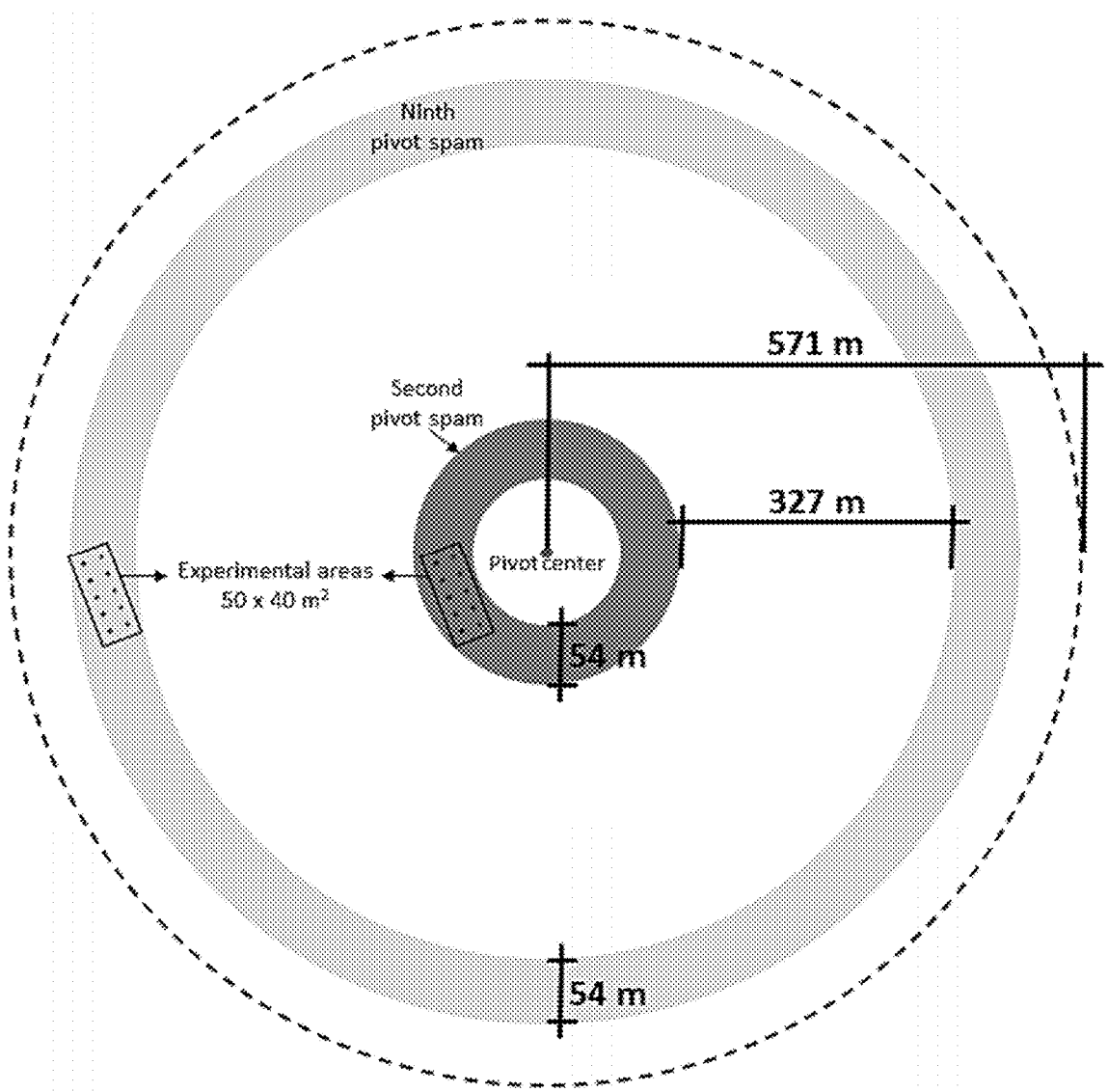
FIG. 4 illustrates a superior view of a schematization of an irrigation pivot in which the agricultural management system 100 combined with artificial light(s) supplementation was installed, according to an embodiment of the present invention.

Between the first and second pivot span towers 103a; 103b, a homogeneous area of 50 by 40 m was delimited, corresponding to an area of 2,000 $m^2$ to be evaluated as the treatment "supplemented by artificial light(s)". The schematization of irrigation pivot 101 according to the experiment can be seen in FIG. 4, in which the crop 202as under the green span of irrigation pivot 101 received artificial light(s) supplementation, while the rectangles indicate the position of both treatments, with and without artificial light(s) supplementation, and the dots in each rectangle indicate the sampling points.

SOYBEAN EVALUATIONS

The evaluations of plant internode number, plant height from the soil level to the highest node, and pods per plant 202a were assessed weekly from the R3 soybean phenological stage (beginning of the pod formation) to R7 (beginning of soybean maturity). During nine weeks, evaluations were performed weekly; no further evaluation was possible after R7 because the plants in the treatment without artificial light(s) supplementation reached physiological maturity earlier than the plants in the treatment of artificial light(s) supplementation.

In this sense, it is important to highlight the delay of physiological maturity induced by the treatment with artificial light(s) supplementation. This extension of the crop 202a cycle stimulated by artificial light supplementation depends on factors such as the crop 202a species, the geographic region of the cropping area, prevailing climate, crop phenological stage, period of suspension of artificial light(s) supplementation, and the crop management.

The soybean crop 202a, for example, extended its cycle between 5 and 20 days, depending on the cultivar, light management, and cropping region. However, this extension was not prominent in grass crops tested, such as corn, *sorghum*, and wheat, being only a few days longer than where artificial light(s) supplementation was not applied. Avoiding any specific theory, this crop cycle extension as affected by artificial light(s) supplementation may be a consequence of a series of metabolic and morphological reactions, such as photomorphogenesis (morphological modification of the 202a culture stimulated by light, which could favor photosynthesis during the day), alteration of the crop 202a predominant photoperiod and crop 202a circadian cycle (modification of the crop 202a routine compared to the period of natural light), regulation of crop 202a secondary metabolism (regulation of natural defenses of crop 202a to stresses), and crop 202a phytochrome activities (photoresponsive substances and response modulators in culture 202a).

Amazingly, it was concluded that through these reactions or stimuli (and other possible causes or joint action of these responses) caused by artificial light(s) supplementation, as well as the correct management of soil and water resources, the crop 202a ends up producing more biomass through a more efficient photosynthesis process. Even after the study, it was observed that the plant stand (quantity of plants per area) could be reduced by about 20%, considering this greater amount of biomass produced (larger canopy and larger root systems). Overall, good productive results were observed, even with smaller stands, which reduces investment in seeds and their agrochemical treatment for sowing, in addition to increasing the sustainability of agricultural activity by producing more food using precise resources and technologies.

The mean measurement of each evaluated variable was estimated from a representative evaluation of the plants 202a in 10 sampling points in each area (2,000 $m^2$). Each sample point evaluated was considered a replication.

The influence of artificial light(s) supplementation or no artificial light(s) supplementation in each variable was evaluated using the area below the progression curve of each specific variable to interpret the results of the evaluations in various times. The area below the progression curve was calculated by trapezoidal integration area below the progression curve=$(dti \times ((Yi+Yi+d)/2))$ Where dti is the time interval between every two observations, Yi and Yi+d. The area below the variable progression curve was calculated based on nine evaluations. Correlations between the area below the progression curve of the evaluated variables were computed to determine whether there was, or not, a linear relationship between them.

The agricultural areas used for each treatment (2,000 m$^2$) were harvested at 115 and 136 days after sowing without and with artificial light(s) supplementation, respectively. Grain yield in each area was expressed in kilograms per hectare (kg ha$^{-1}$).

STATISTICAL ANALYSIS

Extreme values (outliers) in the area below the progression curve of each variable were identified using boxplot graphs of the data residuals. When outliers' values were identified, these were replaced by an average dataset value that does not include the outlier(s). The boxplots were generated in the Software SPSS Statistics®, which was also used to calculate Pearson's correlation coefficients and the basic premises for analysis of variance (ANOVA), normality of residue distribution by Shapiro-Wilk, and homogeneity of variances by Levene, both at p>0.01.

Variance analysis (ANOVA, F test) was performed after confirmation of its assumptions and considering a completely randomized experimental design. When significant differences were observed (p<0.05) in ANOVA, the area below the progression curve of the variables was compared using the Tukey test of averages (p<0.05) to distinguish treatments with artificial light(s) supplementation and without artificial light(s) supplementation. The ANOVA and Tukey test were performed using SISVAR® statistical program. Sigma Plot® v.12 software was used to generate the graphics.

RESULTS

Figure 5:
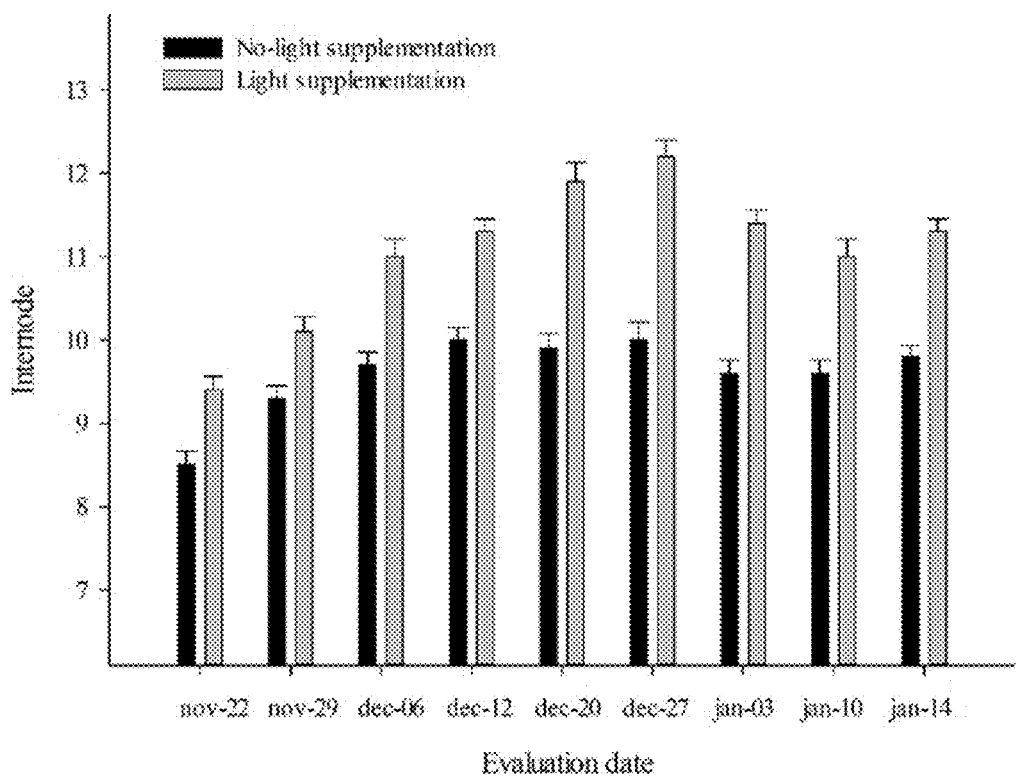
FIG. 5 illustrates a first graph of an analysis of a soybean plant internode variable of the crop 202a over time, under the performance of the agricultural management system 100 allied to artificial light(s) supplementation, according to the embodiment of the present invention.
Figure 6:
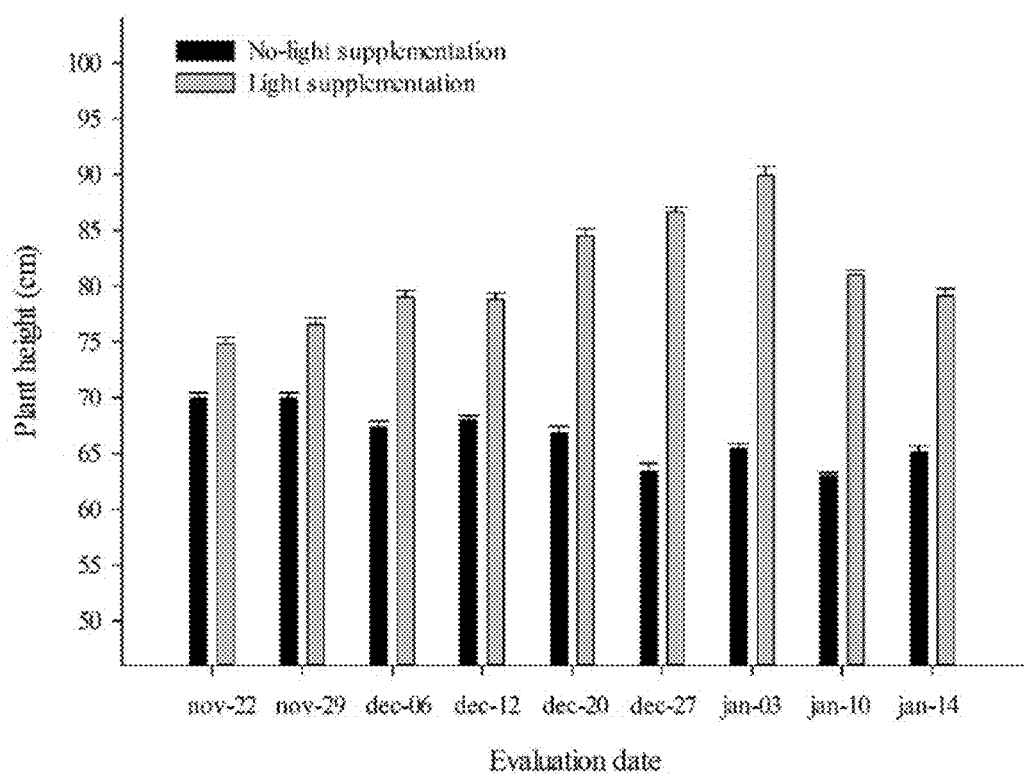
FIG. 6 illustrates a second graph of an analysis of soybean plant height variable of the crop 202a over time, under the action of the agricultural management system 100 allied to artificial light(s) supplementation, according to the present invention embodiment.
Figure 7:
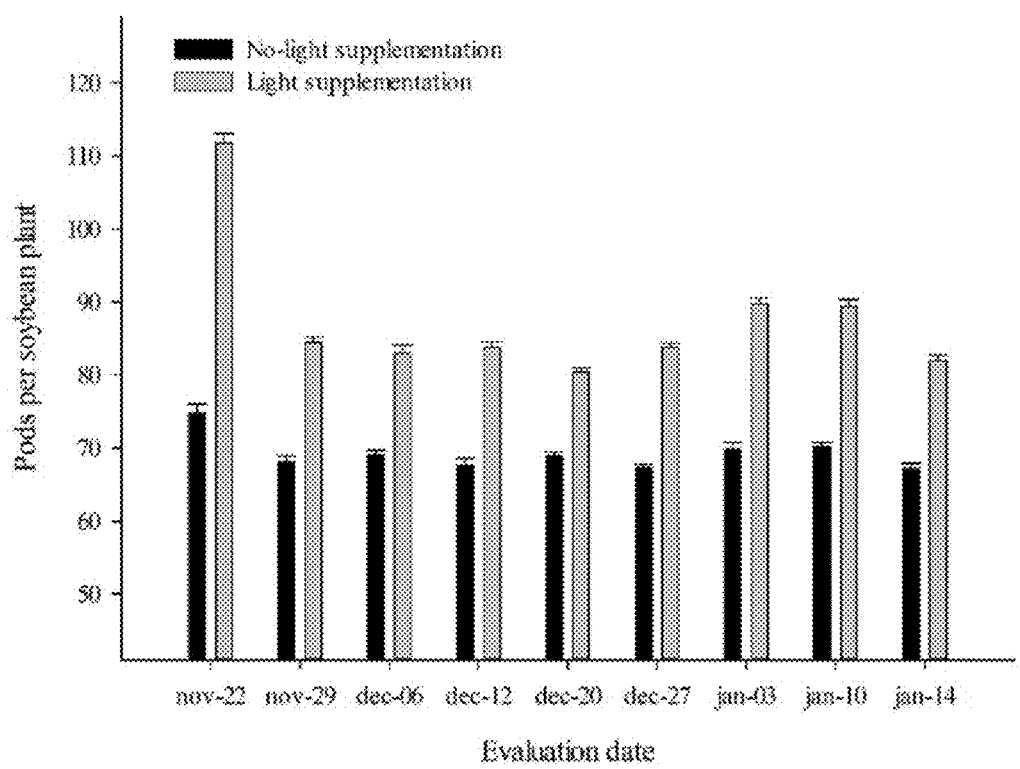
FIG. 7 illustrates a third graph of an analysis of third plant variable of the crop 202a over time, under the action of the agricultural management system 100 combined with artificial light(s) supplementation, according to the embodiment of the present invention.

The weekly evaluation data of all variables (number of soybean internodes, plant height, and number of pods per soybean plant) for both treatments with artificial light(s) supplementation and without artificial light(s) supplementation did not include extreme values. This observation indicates that the responses were grouped around an average with low standard error. The soybean variables and their respective standard errors during the nine weeks are presented in FIGS. 5, 6, and 7, where the lines on the bars indicate the data standard error.

Figure 8:
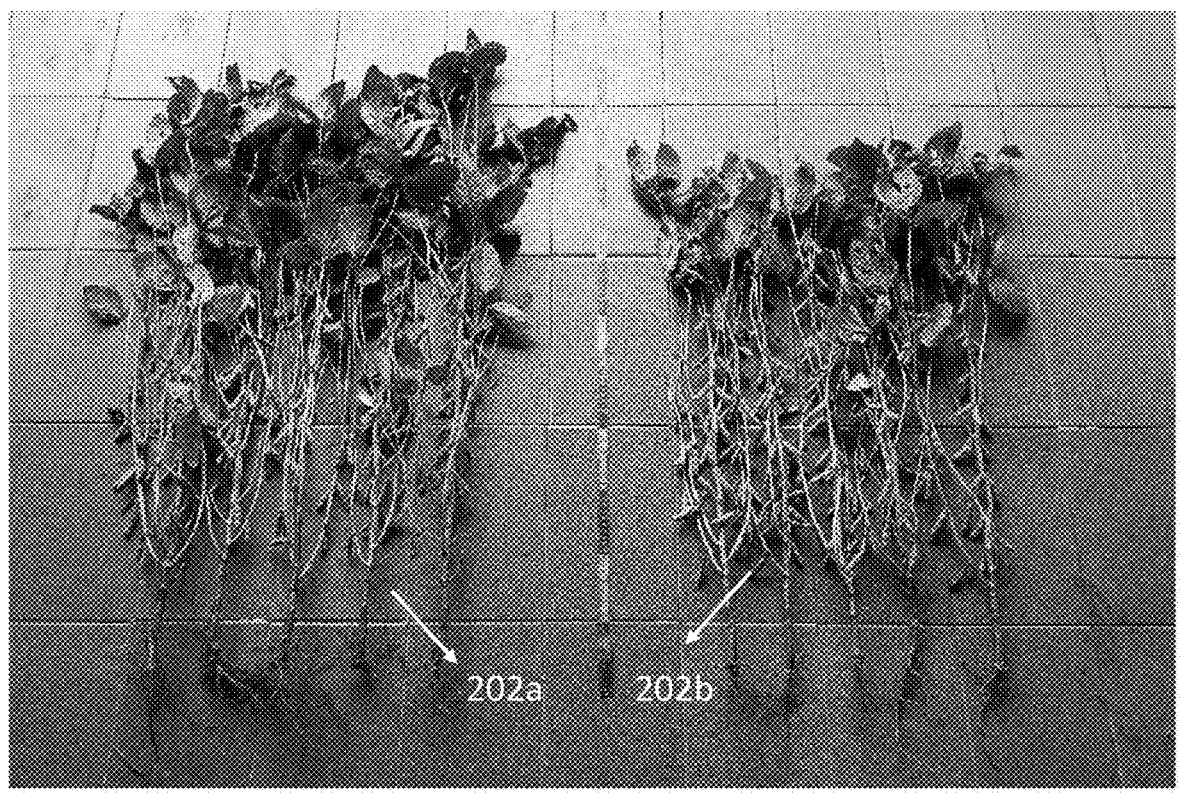
FIG. 8 illustrates a comparison between crop 202a plants under the intervention of the agricultural management system 100 combined with artificial light(s) supplementation, and crop 202b plants with no artificial light(s) supplementation and corresponding crop management, according to the embodiment of the present invention.

The number of internodes per soybean plant, plant height, and the number of pods per plant treated with artificial light(s) supplementation 202a were higher when compared to the sample without artificial light(s) supplementation 202b. These superior responses can also be observed in FIG. 8, where on the left side are represented soybean plants treated with artificial light(s) supplementation 202a at 80 days after sowing, while on the right are represented soybean plants without artificial light(s) supplementation 202b. Each segment on the measuring tape illustrates 0.1 m.

The ANOVA of the area below the progression curve and the assumptions (normality and homogeneity) are presented in Table 2.

TABLE 2

Analysis of variance (F test) and statistics of the ANOVA presumptions of the area below the progression curve of the variables number of soybean internodes, plant height, and the number of pods per soybean plant.

|  | DF | Internodes | Height | Pods per plant |
| --- | --- | --- | --- | --- |
| SV |  |  |  |  |
| Light supplementation | 1 | 375** | 1,590** | 2,649** |

TABLE 2-continued

Analysis of variance (F test) and statistics of the ANOVA presumptions of the area below the progression curve of the variables number of soybean internodes, plant height, and the number of pods per soybean plant.

|  | DF | Internodes | Height | Pods per plant |
| --- | --- | --- | --- | --- |
| Error | 18 |  |  |  |
| CV (%) |  | 1.67 | 1.17 | 0.98 |
| KS | 20 | 0.935+ | 0.985+ | 0.964+ |
| L | 1 + 18 | 1.139+ | 0.106+ | 0.262+ |

**significant differences at 0.01. CV (%) coefficient of variation. KS Kolmogorov-Smirnov statistics for normality of waste distribution (p > 0.01). L Levene statistics for homogeneity of data variances (p > 0.01).
+normality of the residues (KS) or homogeneity of the variances (L) fulfilled.

All the area data below the progression curve of the soybean variables (number of internodes, plant height, and pods per plant) met the assumptions of ANOVA (normality of residue distribution and homogeneity of variances). In addition, the coefficients of variation, CV (%), were very low (<2%). Thus, it was appropriate to proceed with ANOVA, which indicated significant differences (p<0.01) between treatments [with artificial light(s) supplementation and without artificial light(s) supplementation].

The area below the progression curve of the number of internodes per soybean plant, plant height, and the number of pods per plant in the treatment with light(s) supplementation were 15.6, 23.3, and 25.3% higher than the treatment without artificial light(s) supplementation.

Pearson's calculation and interpretation of correlation require that data be normally distributed and without outliers. These requirements were met, as presented in Table 1. All correlations observed in Table 3 were strong (r>0.9) and obtained statistical significance (p<0.01).

TABLE 3

Pearson correlation (r) between the area below the progression curve of the variables studied. Internodes number of soybean internodes; Plant height soybean plant height; Pods per plant number of pods per soybean plant.

|  | Internodes | Plant height | Pods per plant |
| --- | --- | --- | --- |
| Internodes | 1 | 0.962** | 0.970** |
| Plant height |  | 1 | 0.990** |
| Pods per plant |  |  | 1 |

**significant differences at 0.01.

The evaluated soybean cultivar has a cycle of approximately 17 weeks. On day 115 after sowing, soybean plants from the area without artificial light(s) supplementation 202b (2,000 m$^2$) were harvested; however, the harvest of soybean plants in the area with artificial light(s) supplementation occurred three weeks later, representing a 17.6% longer crop 202a cycle.

The estimated productivity of the area without artificial light(s) supplementation was about 4,500 kg ha$^{-1}$ (75 bags ha$^{-1}$; 1 bag=60 kg), while treatment with artificial light(s) supplementation was about 7,080 kg ha$^{-1}$ (118 bags ha$^{-1}$). Grain yield under artificial light(s) supplementation was 57.3% higher and 109.5% above the average Brazilian soybean yield (3,379 kg ha$^{-1}$).

The average cost to produce soybean from soil management to harvesting is about 55 bags of soybean per hectare. The average cost required by artificial light(s) supplementation was about 7 bags ha$^{-1}$. Thus, the profitability of soybean traditionally produced (without artificial light(s) supplementation) and soybean produced with artificial light(s) supplementation was about 20 and 56 bags ha$^{-1}$, respectively.

The extension of the soybean crop 202a cycle by three weeks due to artificial light(s) supplementation also increased the period of plant 202a photosynthetic activity. This prolonged cycle also contributes to increasing biomass accumulation via natural daily photosynthesis, an absent process in the regular soybean cultivar cycle (17 weeks) where no artificial light(s) supplementation 202b was applied. This combination of factors resulted in taller soybean plants, with more internodes, more pods, and, consequently, more than 57% extra grain yield.

In the exposed example, the extra yield generated by the application of adequate crop management and artificial light(s) supplementation cannot be attributed only to the hours of artificial light(s) supplementation provided to each soybean crop 202a (about 40 hours). As mentioned above, in addition to the extension of the soybean cycle through artificial light(s) supplementation, other factors should be taken into account, such as photomorphogenesis, alteration of the plant photoperiod and circadian cycle of culture 202a, upper or lower regulation of phytohormones and phytochromes, as well as changes in secondary metabolism of the crop 202a plant, which are factors responsive to artificial light(s) supplementation.

Agricultural inputs such as fertilizers, plant inoculants, and plant protection products, applied during crop 202a cycle 202b, are intended to maximize agricultural production and economic returns. Although such agricultural inputs have adverse effects on soil dynamics and these effects are often overlooked. However, according to the present invention, artificial light(s) supplementation 200 to field crops can potentially reduce the proportional need for such inputs, mainly fertilizers.

The efficiency of fertilization in this exemplified study probably resulted from a significant increase in shoot biomass followed by artificial light(s) supplementation. The increase in the biomass of the shoots, in turn, causes a proportional increase in the biomass of the roots. This improved root development increases the efficiency of absorption of nutrients by the roots, thus increasing fertilizer efficiency.

The present invention is used as a response model to reproducibly understand and apply the consequences and interactions of nutritional, microbiological, environmental, and economic aspects around agricultural production by integrating valuable information on physiological processes, sowing time, irrigation frequency, and time, fertilizer doses, management of insects and plant diseases, and soil relations with the environment. The inclusion of climate information may clarify the relationship between agricultural production and weather fluctuations. This integrated approach increases the resilience of the global food production system and food security against unexpected climate shocks.

Currently, there is a rapid continuous increase in the integration of technologies and digitization in agriculture. This movement is also aligned with the sustainability of the ecosystems explored for agricultural activities. In this sense, before starting cropping, other factors must be considered for a productive and sustainable agricultural activity. Such other factors include crop management strategies and their consequences, the level of technologies implemented, and soil water and nutrient availability. Although the use of artificial light(s) supplementation on a field scale 200 is a challenge to control, the present invention makes it possible.

The present invention also has great potential to reduce deforestation of new native areas for agricultural production purposes since more food can be produced in the same agricultural area. Although crop 202a productivity can be increased with adequate implementation of artificial light(s) supplementation throughout the crop 202a cycle, the state of the art does not reveal the interactions between the different factors. For example, soil, plant, climate, agronomic management, crop 202a performance, yield formation, and cost-benefit ratio indicate its inherent complexity. In addition, the present invention has the potential to reduce the use of agrochemicals, fertilizers, and water since the plant becomes more efficient in soil exploration through an improved root system stimulated by artificial light(s) supplementation and other technologies implemented.

According to the present invention, the production costs of crops 202a cultivated by the artificial light(s) supplementation system 100 depend on several factors. These factors include the efficiency of the available cropping structure, for example, machinery and farm administration; the technology implemented, for example, genetic materials and fertilizers; and the use of precise agricultural systems. Other factors include the characteristics of the irrigation system, for example, the irrigated area and the height of the irrigation pivot 101 that affects light dissipation, artificial light(s) supplementation in areas of static irrigation, soil structuring, for example without physical or chemical limitation, and with healthy microbiota; electricity supply, for example, source, spinning, constancy, and stability, in addition to the internet of things and agronomic management of agricultural crops 202a. Thus, the cost and profitability in this example reflect a specific scenario of soybean production that may vary on a case-by-case basis. Despite this observation, according to the present invention, artificial light(s) supplementation presents an opportunity to improve crop 202a production.

In conclusion, in the exemplified study, the present invention was implemented and delivered approximately 40 hours of artificial light(s) supplementation to each soybean plant were required during the crop 202a cycle to positively affect the number of internodes, pods, plant height, and crop 202a cycle.

Artificial light(s) supplementation, according to the present invention, increased soybean yield by 57.3% and its profitability by 180% in relation to cultivation processes without artificial light(s) supplementation and proved to be a viable and promising technique to improve sustainably of crop production in the same agricultural field.

Due to the youth of outdoor artificial light(s) supplementation technology and due to its success being associated with its application integrated with technically adequate and balanced agriculture, preliminary studies were conducted for other crops besides soybeans (*Glycine max*). However, the results obtained have been positive for biomass production by plants were light(s) supplementation was (were) present. The responses observed for other crops and perceptions of the application of artificial light(s) supplementation integrated with appropriate agronomic technologies and management will be briefly discussed below.

BEANS (*Phaseolus Vulgaris*)

The common bean was cultivated in the winter crop season and received artificial light(s) supplementation from post-sowing until pre-harvest. Soil remineralizers and biological products were applied before sowing. The plant stand was reduced by 15% compared to the regular stand recommendation for traditional crop cultivation without artificial light(s) supplementation.

A lower number of fungicide applications and 36% more grain yield were observed in the area that received artificial light(s) supplementation. Other studies with beans were conducted in different regions and confirmed the positive response of this crop when artificial light(s) supplementation is applied according to the present invention.

CORN (*Zea Mays*)

Corn was grown in spring/summer and received artificial light(s) supplementation from post-sowing until pre-harvest, as well as soil remineralizers, organominerals, and biological products that were applied to the soil before sowing. In this study, the plant stand (plant number per hectare) was 60% higher than the stand regularly used in traditional cultivation without artificial light(s) supplementation.

Differences were observed among the studied varieties (hybrids), such as plants generally higher (>4 m), higher average ear number per plant, and greater crop health. Healthier plants in the area that received artificial light(s) supplementation allowed crop cultivation with fewer fungicide applications. Grain yield was 183% higher than the regional grain yield average for the same year.

TOMATO (*Solanum lycopersicum*)

Different varieties of tomato for pulp were evaluated, and the area that received artificial light(s) supplementation presented plants with superior development of the aerial plant part compared to the area without artificial light(s) supplementation. This further development of the aerial part allowed the early plant cover of the space between planting lines and doubled the production of tomato fruits.

Only the area that did not receive artificial light(s) supplementation had problems with calcium deficiency, causing the "blossom end rot" symptom in the fruits. In the area that received artificial light(s) supplementation, no such stress was observed that would impair the development of the plants and their respective productions.

Both areas received soil remineralizers and foliar nutrients. Artificial light(s) supplementation occurred throughout the crop cycle in the respective area, and the light color combination used in soybean (59% red, 33% green, and 8% blue) showed excellent results in tomato plant development.

COTTON (*Gossypium hirsutum*)

Cotton was tested in different regions and different varieties. As observed for the other crops, the aerial part of the cotton plants that received the artificial light(s) supplementation project was significantly higher than the plants that did not receive artificial light(s) supplementation.

The cotton tree that received the artificial light(s) supplementation project produced 20 to 40% more "apples" (structure containing the plume, the cotton fiber) per plant and about 12% more final fiber production. The artificial light(s) supplementation positively impacted the final production and quality of the cotton fiber. The presence of insects in the area that received artificial light(s) supplementation was reduced compared to traditional cotton cultivation without artificial light(s) supplementation.

SUGARCANE (*Saccharum officinarum*)

Artificial light(s) supplementation in sugarcane has brought many beneficial effects. The area received the application of soil remineralizer and was cultivated without any fungicide application. Initially, sugarcane with artificial light(s) supplementation showed a higher number of tillers (seedlings) per clump, which increased the production of crop biomass.

Stem height, total soluble solids content, apparent sucrose, and recovered total sugars were higher in sugarcanes grown with artificial light(s) supplementation. The "brown spot" was a foliar fungal disease that occurred only in the area that did not receive artificial light(s) supplementation, indicating how the present invention promotes not only increases in yield, but also increases the plant resistance to stresses and reduces the cost and environmental impacts with lower frequencies of fungicide application.

TOBACCO (*Nicotiana tabacum*)

More vigorous tobacco plants, larger leaves, and higher leaf production were commonly observed in the area that received artificial light(s) supplementation. The tobacco cropping area received the application of soil remineralizer and was cultivated without any application of insecticide or fungicide. Light supplementation with the predominance of blue collars favored the development of tobacco plants.

Garlic (*Allium sativum*) and Onion (*Allium cepa*)

Areas that received the application of soil remineralizer and organominerals were cultivated without any insecticide application and with a reduced amount of fungicide applications. The yields were higher than 80% in the areas that received artificial light(s) supplementation all night during specific periods, both for garlic and onion.

The application of foliar fertilizers was similar between the areas [with or without light(s) supplementation]; however, the excellent plant development caused by artificial light(s) supplementation turned the plant more sensitive to the lack of essential nutrients, especially those required in smaller amounts (micronutrients).

PEA (*Pisum sativum*)

Pea is a crop that responds satisfactorily well to artificial light(s) supplementation. Depending on its application (grain production or cover crop), it should be changed the color composition of artificial light(s) supplementation.

The high pea biomass production, which increased the crop residues added to the soil surface, was produced with a predominance of blue coloration in the artificial light(s) supplementation; however, for exclusive grain production, the composition of artificial light(s) supplementation in soybean (59% red, 33% green and 8% blue) was more adequate.

SUNFLOWER (*Helianthus annuus*)

Artificial light(s) supplementation increased the size of the sunflowers, increasing the production of larger seeds with improved quality parameters such as size and integrity. Sunflower areas cultivated with artificial light(s) supplementation showed high vegetative-productive development and plant sanity.

In areas where artificial light(s) supplementation was applied, insecticides or fungicides were not applied to the crop plants. The production of sunflower seeds was 44% higher in the area that received the artificial light(s) supplementation compared to the traditional cultivation area without artificial light(s) supplementation.

POTATO (*Solanum tuberosum*)

Different varieties and planting stands were studied for potatoes that received artificial light(s) supplementation. Artificial light(s) supplementation in this crop can be used from emergence until about ten days before harvest desiccation. The production occurred with lower use of fungicides compared to the area without artificial light(s) supplementation and the commercial cropping area adjacent to the experimental area 200.

There was a large production of root tubers, and production was about 38% higher than in traditional cultivation without artificial light(s) supplementation. Soil and organomineral remineralizers were used in both areas to complement the basic fertilization and support higher root tuber productions.

HOPS (*Humulus lupulus*)

The artificial light(s) supplementation applied to hop plants generated promising results. It was possible to develop and harvest the second crop of hops in the same agricultural year, which was not observed in the area without artificial light(s) supplementation. The number of floral cones (structures used as raw material for beer) was much higher, and their dimensions were larger in plants that received artificial light(s) supplementation.

The beer produced using the hops produced with artificial light(s) supplementation did not present any harm in relation to traditional cultivation. Therefore, artificial light(s) supplementation allowed more than doubling the productive capacity of hops in an area, besides not negatively affecting beer production and quality.

STRAWBERRY (*Fragaria× Ananassa*)

Production, fruit sanity, and shelf time were superior for strawberries produced with artificial light(s) supplementation applied throughout the crop cycle. Some strawberry varieties respond better to artificial light(s) supplementation. In general, reddish artificial light(s) supplementation provides better results in fruit production and seedlings of plant development.

PITAYA (*Hylocereus undatus*)

The number of crops and fruits was positively affected by artificial light(s) supplementation. The harvests became continuous with adequate crop management and artificial light(s) supplementation. About 4 to 6 hours of artificial light(s) supplementation per night were enough to maintain this fruit harvest constancy and increase the number of fruits per plant. With increased harvests per year and fruits per plant, the required amounts of fertilizers, soil pH correctors and conditioners, soil remineralizers, and organominerals were necessary to support the production.

This situation of great fertilizer need to compensate for a higher total production is further indication that the full functioning of artificial light(s) supplementation, according to the present invention, is dependent on other factors that need to be available so that plant responses are not limited by factors whose deficiency may compromise crop full development and yield.

LETTUCE (*Lactuca sativa*) AND ARUGULA (*Eruca vesicaria* Ssp. *Sativa*)

All experiments with horticultural crops with artificial light(s) supplementation showed more accelerated plant development from seedlings to adult plants, allowing for more year-round harvests. In addition, they presented more intense colors and more pleasant flavors.

The use of more bluish artificial light(s) supplementation allowed better results; however, there are significant differences in responses between the varieties studied in each plant species. This observation indicates that each region should be studied for adequate crop varieties to select those with better responses to artificial light(s) supplementation.

COVER CROPS

Different cover crops were responsive to artificial light(s) supplementation, and all responses were positive. The higher the plant biomass (e.g., leaves, stems, and roots) growth, the faster the covering of the cropping area, which improves soil protection and reduces crop competition with invasive plants (weeds). The cropping of solitary crop species (only one predominant species) or mixtures of different species presented improved results under artificial light(s) supplementation.

The use of more bluish artificial light(s) supplementation also allowed better results. However, it was clear how each cover crop (such as Sudan grass, fodder turnip, millet, crotalaria, wheat, and buckwheat) in different regions presented differentiated responses to the same spectral signature of artificial light(s) supplementation, indicating that different crop species would have distinct and unique spectral band composition for each plant species and edaphoclimatic condition.

The achievements exposed above indicated that the present invention accomplishes significant advances in the application and development of artificial light(s) supplementation, highlighting the beneficial effects of the use of artificial lighting sources $10a$, $10b$, $10c$, $10d$, $10e$ in the metabolism and agronomic management of plants, in the efficiency of light absorption and photosynthesis in their respective aerial parts, as well as in the mitigation of stresses such as insect pests and plant pathogens that can be repelled or controlled in the areas that receive a light(s) supplementation. These effects benefit the agricultural production process by extending the plant resistance to adverse conditions during crop development, improving qualitative and nutritional aspects of the final crop product, and elevating the sustainability of the agricultural activity.

Despite the description of crop yield achievements to specific accomplishments, the present invention may present modifications in its implementation so that the scope of protection of the invention is limited to the content of the attached claims, including possible equivalent variations.

The invention claimed is:

1. AGRICULTURAL MANAGEMENT SYSTEM (100) is characterized by comprising:
   a modular agricultural irrigation pivot-like device (101) positioned on an agricultural field (200) in the cultivation of a crop (202a) species, the modular agricultural irrigation pivot-like device (101) comprising:
   a plurality of artificial lighting sources ($10a$, $10b$, $10c$, $10d$, $10e$) arranged along the modular agricultural irrigation pivot-like device (101) at a predetermined distance above the aerial parts of the crop (202a), comprising a plurality of light-emitting diodes; and
   a plurality of energy sources that feed the plurality of artificial lighting sources ($10a$, $10b$, $10c$, $10d$, $10e$),
   the agricultural management system (100) further comprising:
   a processor in communication with a dimerizer and/or a polarizer of the plurality of artificial lighting sources ($10a$, $10b$, $10c$, $10d$, $10e$) and with the plurality of energy sources, wherein the processor is configured to:
   a) adjust (501), in the intervals of the electromagnetic spectrum, the balance between the spectral bands emitted by the plurality of light-emitting diodes; and
   b) determine and implement:
   an irrigation routine (502); and/or
   an artificial light(s) supplementation routine (503);
   wherein stages a) and b) are determined by the processor considering at least one among:
   a crop (202a) species under cultivation;
   a phenological stage of the crop (202a) under cultivation;
   a photoperiod, a season and current weather conditions under which the agricultural field (200) is subjected; and
   one or more objective(s) intended for the crop (202a) development.

2. SYSTEM (100), according to claim 1, characterized in that stages a) and b) determined by the processor using an artificial intelligence model.

3. SYSTEM (100), according to claim 1, characterized in that the modular agricultural irrigation pivot-like device (101) comprises:

a drive device for the displacement of the modular agricultural irrigation device (101) over the agricultural field (200); and sprinkler devices comprising a plurality of sprinklers, wherein the processor is in communication with the drive device and with the sprinkler device for the execution of stage b).

4. AGRICULTURAL MANAGEMENT METHOD (500), for the cultivation of a crop (202*a*) in an agricultural field (200), characterized by comprising the steps of:

a) adjusting (501), in intervals of the electromagnetic spectrum, the balance between the spectral bands emitted by a plurality of light-emitting diodes of a plurality of artificial lighting sources (10*a*, 10*b*, 10*c*, 10*d*, 10*e*); and b) determining and implementing:

an irrigation routine (502) of a modular agricultural irrigation device (101); and/or a routine of artificial light(s) supplementation (503) of the plurality of artificial lighting sources (10*a*, 10*b*, 10*c*, 10*d*, 10*e*);

wherein stages a) and b) are determined considering at least one among:

a crop (202*a*) species under cultivation;

a phenological stage of the crop (202*a*) under cultivation;

a season, a photoperiod, and current weather conditions under which the agricultural field (200) is subjected; and one or more objective(s) intended for the crop (202) development.

5. METHOD (500), according to claim 4, characterized in that stages a) and b) are determined by the processor using an artificial intelligence model.

6. METHOD (500), according to claim 4, is characterized by further comprising a stage c) of determining a routine of soil management in the agricultural field (200) based on soil analyses from the agricultural field (200).

7. METHOD (500), according to claim 6, characterized in that stage c) of determining through the artificial intelligence model considers at least one of the following:

the irrigation routine (502);

the routine of artificial light(s) supplementation (503);

the crop (202*a*) species under cultivation;

the phenological stage of the crop (202*a*) under cultivation;

the photoperiod, the season and the current weather conditions under which the agricultural field (200) is subjected; and the one or more objective(s) intended for the crop (202*a*) development.

* * * * *